US009313670B2

(12) United States Patent
Martin et al.

(10) Patent No.: US 9,313,670 B2
(45) Date of Patent: Apr. 12, 2016

(54) METHOD AND APPARATUS FOR FACILITATING CONTROLLED UPDATING OF A NEIGHBOR LIST

(75) Inventors: Brian Martin, Farnham (GB); Keiichi Kubota, Weybridge (GB); Mitsuya Saito, Camberley (GB)

(73) Assignee: Nokia Technologies Oy, Espoo (FI)

( * ) Notice: Subject to any disclaimer, the term of this patent is extended or adjusted under 35 U.S.C. 154(b) by 806 days.

(21) Appl. No.: 13/209,757

(22) Filed: Aug. 15, 2011

(65) Prior Publication Data

US 2012/0149429 A1 Jun. 14, 2012

Related U.S. Application Data

(60) Provisional application No. 61/373,971, filed on Aug. 16, 2010.

(51) Int. Cl.
*H04W 24/00* (2009.01)
*H04W 24/02* (2009.01)
*H04W 36/00* (2009.01)

(52) U.S. Cl.
CPC .......... *H04W 24/02* (2013.01); *H04W 36/0083* (2013.01)

(58) Field of Classification Search
CPC .................. H04W 24/02; H04W 36/0083
USPC .............. 455/434, 436, 437, 525, 500, 515, 455/435.2, 452.1, 67.11
See application file for complete search history.

(56) References Cited

U.S. PATENT DOCUMENTS

| | | | | |
|---|---|---|---|---|
| 5,915,221 A | * | 6/1999 | Sawyer et al. | 455/437 |
| 6,845,238 B1 | * | 1/2005 | Muller | 455/436 |
| 6,917,809 B2 | * | 7/2005 | Horwath et al. | 455/436 |
| 2006/0121907 A1 | * | 6/2006 | Mori et al. | 455/447 |
| 2007/0207822 A1 | * | 9/2007 | Andersson et al. | 455/502 |

(Continued)

FOREIGN PATENT DOCUMENTS

| | | |
|---|---|---|
| CN | 1399855 A | 2/2003 |
| EP | 0843945 A1 | 5/1998 |

(Continued)

OTHER PUBLICATIONS

"3GPP R2-106479, Inter-frequency detected set measurements events;" Nokia Corporation, Nokia Siemens Networks; 3GPP TSG-RAN WG2 Meeting #7; Nov. 15-19, 2010.

(Continued)

*Primary Examiner* — John J Lee
(74) *Attorney, Agent, or Firm* — Alston & Bird LLP

(57) ABSTRACT

A method, apparatus and computer program product are provided to permit a neighbor list to be updated with a detected set cell such that the detected set cell may thereafter be utilized for determining a frequency quality estimate or for inter-frequency measurements and/or considered for inclusion in a virtual active set. From a network perspective, the method may receive information regarding a detected cell that is not on a neighbor list for a user equipment (UE) and that operates at a non-used frequency and may cause a message to be transmitted to the UE adding the detected cell to the neighbor list. From a UE perspective, the method may cause information to be provided regarding a detected cell that is not on a neighbor list and that operates at a non-used frequency and may thereafter receive a message adding the detected cell to the neighbor list.

18 Claims, 9 Drawing Sheets

(56) References Cited

U.S. PATENT DOCUMENTS

| | | | |
|---|---|---|---|
| 2007/0298780 A1 | 12/2007 | Lindoff et al. | |
| 2008/0002628 A1* | 1/2008 | Bi et al. | 370/335 |
| 2009/0047961 A1 | 2/2009 | Kim | |
| 2009/0069012 A1* | 3/2009 | Tu | 455/436 |
| 2009/0176490 A1* | 7/2009 | Kazmi et al. | 455/434 |
| 2010/0177758 A1* | 7/2010 | Aqvist et al. | 370/342 |
| 2011/0105119 A1 | 5/2011 | Bienas et al. | |
| 2011/0244858 A1* | 10/2011 | Callender | 455/436 |
| 2012/0076018 A1* | 3/2012 | Singh et al. | |
| 2013/0210438 A1 | 8/2013 | Martin et al. | |

FOREIGN PATENT DOCUMENTS

| | | |
|---|---|---|
| EP | 2037696 A1 | 3/2009 |
| WO | WO-01/20942 A1 | 3/2001 |
| WO | WO-2005/101890 A1 | 10/2005 |
| WO | WO-2008/147267 A1 | 12/2008 |

OTHER PUBLICATIONS

"Radio Resource Control (RRC): Protocol Specification (Release 10);" 3GPP TS 25.331, v 10.0.0; dated Jun. 2010.

LS on Enabling Detected Set Feature for Inter-Frequency Measurements, 3GPP TSG-RAN WG2 Meeting #70, R2-103396 (May 10-14, 2010) 1 page.

International Search Report and Written Opinion for Application No. PCT/ FI2011/050712; dated Oct. 28, 2011.

Office Action for Chinese Application No. 201180049760.6 dated May 26, 2015, 6 pages.

U.S. Appl. No. 61/374,016, filed Aug. 16, 2010; In re: Martin et al.; entitled Cell-Based Inter-Frequency Measurement Events for Detected or Monitored Set Cells.

\* cited by examiner

METHOD AND APPARATUS FOR FACILITATING CONTROLLED UPDATING OF A NEIGHBOR LIST

CROSS-REFERENCE TO RELATED APPLICATIONS

This application claims priority to U.S. Provisional Patent Application No. 61/373,971, filed Aug. 16, 2010, which is hereby incorporated herein in its entirety by reference.

TECHNICAL FIELD

Example embodiments of the present invention generally relate to cellular networks and, more particularly, relate to managing a list of neighbor cells based on one or more detected cells outside of the list.

BACKGROUND

During network configuration or other network planning exercises, a neighbor list may be defined that identifies a plurality of cells that may be capable of supporting communications between a user equipment (UE) and the network. The cells included within the neighbor list may include cells that operate at the frequency that is currently used by the UE, as well as cells that operate at a different frequency that is not currently used by the UE, but that may also support communications between the UE and the network.

In operation, the UE may monitor the performance, such as the signal strength, of the first cell that is supporting communications between the UE and the network as well as a number of other cells. Based upon the relative performance of the cells as well as a number of other factors, the UE may be handed over from the first cell to another cell included within the neighbor list such that the other cell then begins to support communications between the UE and the network. For example, the UE may be handed over from the first cell to the other cell in instances in which the performance of the other cell exceeds that of the first cell. In instances in which the other cell operates at a different frequency than the first cell, the hand over may result in the communications between the UE and the network not only being supported by a different cell, but also being conducted at a different frequency.

BRIEF SUMMARY

In view of the foregoing background, a method, apparatus and computer program product are provided to permit a neighbor list to be updated with a detected set cell. Once the neighbor list is updated with the detected set cell, the detected set cell may be utilized for determining a frequency quality estimate or for inter-frequency measurements and/or considered for inclusion in a virtual active set. From a network perspective, the method may receive information regarding a detected cell that is not on a neighbor list for a user equipment (UE) and that has a different frequency than the frequency currently in use by the UE and may cause a message to be transmitted to the UE adding the detected cell to the neighbor list. From a UE perspective, the method may cause information to be provided regarding a detected cell that is not on a neighbor list and that has a different frequency than the frequency currently in use and may receive a message adding the detected cell to the neighbor list. As such, the network, such as a base station, and the UE may cooperate to controllably update a neighbor list with one or more detected set cells.

BRIEF DESCRIPTION OF THE DRAWINGS

Reference is now made to the accompanying drawings, which are not necessarily drawn to scale, and wherein.

DETAILED DESCRIPTION

Figure 1:
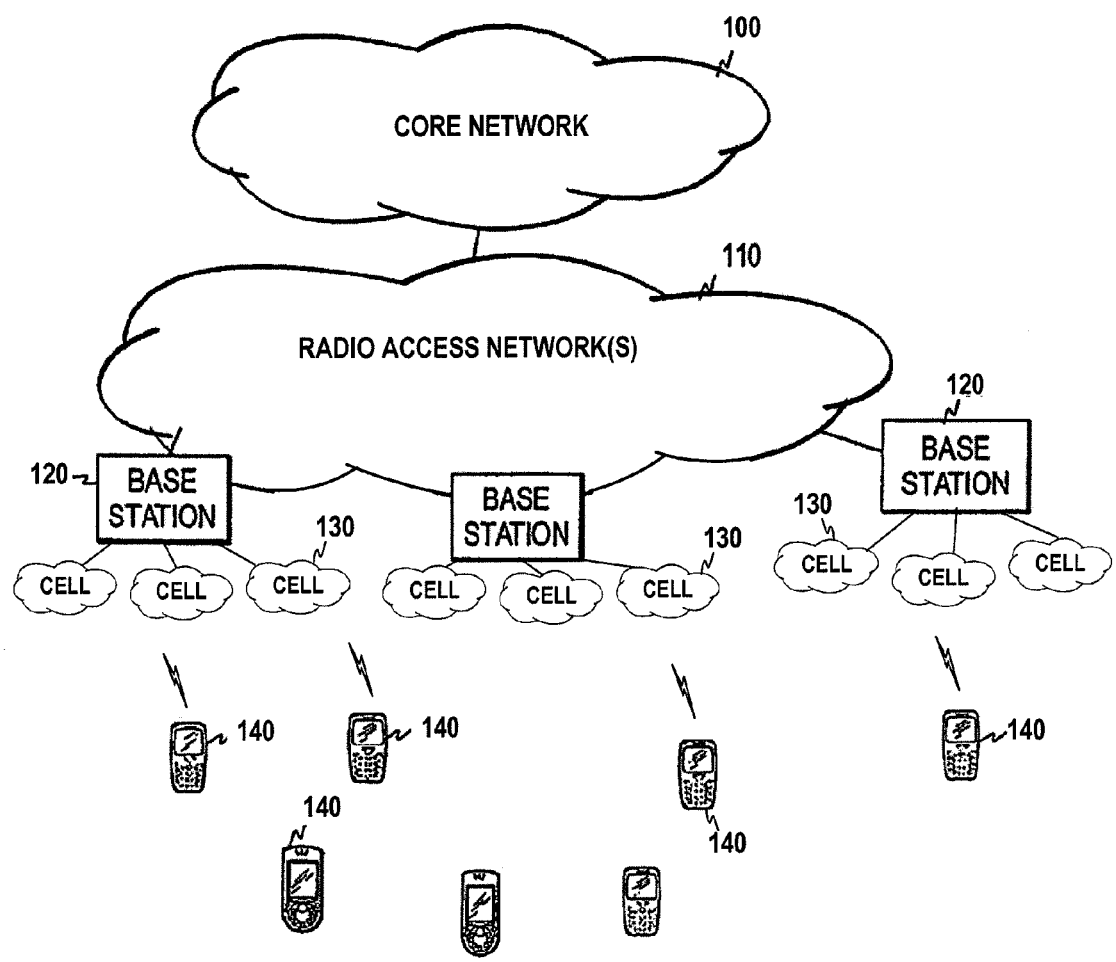
FIG. 1 illustrates a heterogeneous communication system according to one example embodiment of the present invention.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. Reference may be made herein to terms specific to a particular system, architecture or the like, but it should be understood that example embodiments of the present invention may be equally applicable to other similar systems, architectures or the like.

The terms "data," "content," "information," and similar terms may be used interchangeably, according to some example embodiments of the present invention, to refer to data capable of being transmitted, received, operated on, and/or stored. The term "network" may refer to a group of interconnected computers or other computing devices. Within a network, these computers or other computing devices may be interconnected directly or indirectly by various means including via one or more switches, routers, gateways, access points or the like.

Further, as used herein, the term "circuitry" refers to any or all of the following: (a) hardware-only circuit implementations (such as implementations in only analog and/or digital circuitry); (b) to combinations of circuits and software (and/or firmware), such as (as applicable): (i) a combination of processor(s) or (ii) portions of processor(s)/software (including digital signal processor(s)), software and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Further, as described herein, various messages or other communication may be transmitted or otherwise sent from one component or apparatus to another component or apparatus. It should be understood that transmitting a message or other communication may include not only transmission of the message or other communication, but may also include preparation of the message or other communication by a transmitting apparatus or various means of the transmitting apparatus.

As defined herein a "computer-readable storage medium," which refers to a non-transitory, physical storage medium (e.g., volatile or non-volatile memory device), can be differentiated from a "computer-readable transmission medium," which refers to an electromagnetic signal.

FIG. 1 depicts a heterogeneous communications system according to various example embodiments of the present invention. Generally, the system includes one or more public land mobile networks (PLMNs) coupled to one or more other data or communication networks—notably a wide area network (WAN) such as the Internet. As shown, each of the PLMNs includes a core network 100 backbone such as the Evolved Packet Core (EPC); and each of the core networks and the Internet are coupled to one or more radio access networks 110, air interfaces or the like that implement one or more radio access technologies. As shown, the radio access networks each include one or more base stations 120 (or node B elements), access points or the like, each of which may serve a coverage area divided into one or more cells 130.

In addition, the system includes one or more mobile radio units that may be varyingly known as user equipment (UE) 140, terminal equipment, mobile station, mobile terminal or the like. As a mobile terminal, the UE may be a mobile computer, mobile telephone, a portable digital assistant (PDA), a pager, a mobile television, a gaming device, a mobile computer, a laptop computer, a camera, a video recorder, an audio/video player, a radio, and/or a global positioning system (GPS) device, any combination of the aforementioned, or the like. In operation, these UEs may be configured to connect to one or more of the radio access networks 110 according to their particular radio access technologies to thereby access a particular core network of a PLMN, or to access one or more of the other data or communication networks (e.g., the Internet). In various instances, a single UE, a dual-mode or multimode UE, may support multiple (two or more) radio access networks—thereby being configured to connect to multiple radio access networks. For example, a particular UE may support both Global System for Mobile communications (GSM) and Universal Mobile Telephone System (UMTS) radio access technologies.

Examples of radio access technologies include $3^{rd}$ Generation Partnership Project (3GPP) radio access, UMTS radio access UTRAN (Universal Terrestrial Radio Access Network), GSM radio access, Code Division Multiple Access (CDMA) 2000 radio access, Wireless Local Area Networks (WLANs) such as IEEE 802.xx networks (e.g., 802.11a, 802.11b, 802.11g, 802.11n, etc.), world interoperability for microwave access (WiMAX) networks, IEEE 802.16, and/or wireless Personal Area Networks (WPANs) such as IEEE 802.15, Bluetooth, low power versions of Bluetooth, ultra wideband (UWB), Wibree, Zigbee or the like. 3GPP radio access technologies may include, for example, $3^{rd}$ Generation (3G) or 3.9G (also referred to as UTRAN Long Term Evolution (LTE) or Super 3G) or E-UTRAN (Evolved UTRAN).

Generally, a radio access technology may refer to any $2^{nd}$ Generation (2G), 3G, $4^{th}$ Generation (4G) or higher generation mobile communication technology and their different versions, as well as to any other wireless radio access technology that may be arranged to interwork with such a mobile communication technology.

Figure 2:
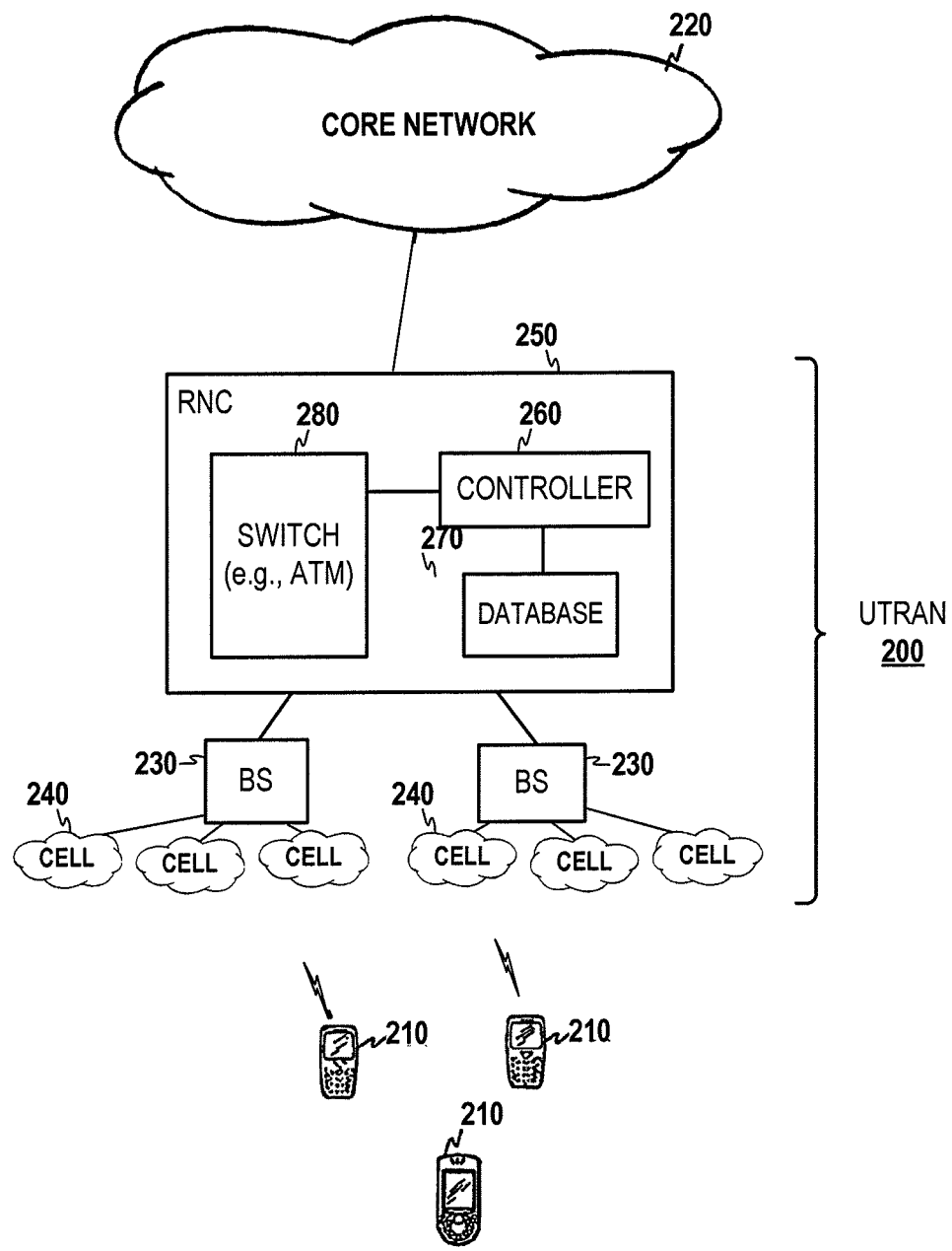
FIG. 2 illustrates a public land mobile network according to one example embodiment of the present invention.

Referring now to FIG. 2, a PLMN including a UTRAN is more particularly illustrated according to various example embodiments of the present invention. In this regard, example embodiments of the present invention may be particularly described with respect to UTRAN. More information on aspects of UTRAN may be found, for example, in 3GPP TS 25.331 v. 10.0.0 (2010-06), entitled: *Radio Resource Control (RRC): Protocol Specification (Release* 10), the content of which is incorporated by reference in its entirety. It should be understood, however, that example embodiments may be equally applicable to other radio access technologies.

The UTRAN 200, which is one of the 3rd Generation Wireless Mobile Communication Technologies, can carry many traffic types from real-time circuit switched (CS) to Internet Protocol (IP)-based packet switched (PS) traffic. The UTRAN allows connectivity between the UE 210 and the core network 220. UMTS may use wideband code division multiple access (WCDMA). The UTRAN contains the base stations (BSs) 230, called Node Bs, each of which serves a coverage area divided into cell(s) 240. As shown, UE 210, core network 220, BS 230 and cell 240 are examples of respective ones of UE 140, core network 100, base station 120 and cell 130 of FIG. 1.

The UTRAN 200 may also include radio network controllers (RNCs) 250, each of which may provide control functionalities for one or more Node Bs. A Node B 230 and an RNC can be the same device, although typical implementations have a separate RNC located in a central office serving multiple Node Bs. Despite the fact that they do not have to be physically separated, there is a logical interface between them. The RNC and its corresponding Node Bs are called the radio network subsystem (RNS). There can be more than one RNS present in an UTRAN.

As also shown, a radio access network 110 may more generally include some type of network controlling/governing entity, such as the RNC 250 in UTRAN 200, which may be responsible for control of the BSs 230 (e.g., Node Bs) that are connected to the controller. As used herein, the term "network controller" or "network controlling/governing entity" may refer to any network element or a set of network elements configured to use inter-radio access technology measurements for a network decision. Such a network controlling/governing entity may also include a BS or a Node-B. The network controlling/governing entity may include a controller 260, processor or the like programmed to carry out radio resource management and mobility management functions, etc. The controller may be associated with a memory or database 270 for maintaining information required in the management functions. The network controlling/governing entity may include a switch unit 280 (such an Asynchronous Transfer Mode (ATM) switch) for switching connection between network elements within the radio access network. The network controlling/governing entity may be connected to a Circuit Switched Core Network through e.g., Media Gateway (MGW) and to e.g., a Serving General Packet Radio Service (GPRS) Support Node (SGSN) in a Packet Switched Core Network.

Figure 3:
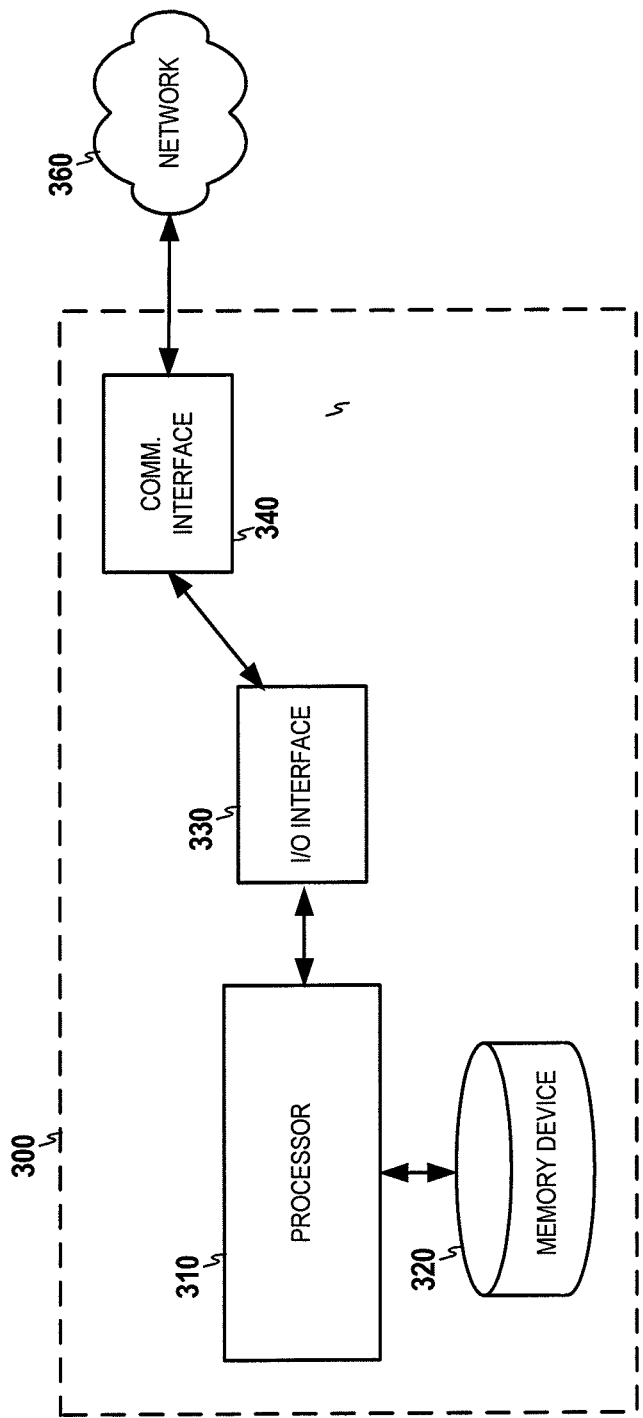
FIG. 3 is a block diagram of an apparatus that may be configured to operate within the system of FIG. 1, according to one example embodiment of the present invention.

Reference is now made to FIG. 3, which illustrates an apparatus 300 according to an example embodiment of the present invention configured to perform the various functionalities described herein. As shown and described herein, the example apparatus may be configured to function as or otherwise implement one or more of the network components depicted in FIG. 1 or 2 (e.g., BS 120, 230). The example apparatus depicted in FIG. 3 may also be configured to perform example methods of the present invention.

In some example embodiments, the apparatus 300 may, be embodied as, or included as a component of, a communications device with wired or wireless communications capabilities. In this regard, the apparatus may be configured to operate in accordance with the functionality of one or more network elements as described herein. The example apparatus may include or otherwise be in communication with one or more processors 310, memory devices 320, Input/Output (I/O) interfaces 330 and/or communications interfaces 340 (one of each being shown). The processor may be embodied as various means for implementing the various functionalities of example embodiments of the present invention including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to one example embodiment, the processor may be representative of a plurality of processors, or one or more multiple core processors, operating in concert. Further, the processor may be comprised of a plurality of transistors, logic gates, a clock (e.g., oscillator), other circuitry, and the like to facilitate performance of the functionality described herein. The processor may, but need not, include one or more accompanying digital signal processors. In some example embodiments, the processor is configured to execute instructions stored in the memory device or instructions otherwise accessible to the processor. The processor may be configured to operate such that the processor causes the apparatus to perform various functionalities described herein.

Whether configured as hardware or via instructions stored on a computer-readable storage medium, or by a combination thereof, the processor 310 may be an entity capable of performing operations according to embodiments of the present invention while configured accordingly. Thus, in example embodiments where the processor is embodied as, or is part of, an ASIC, FPGA, or the like, the processor is specifically configured hardware for conducting the operations described herein. Alternatively, in example embodiments where the processor is embodied as an executor of instructions stored on a computer-readable storage medium, the instructions specifically configure the processor to perform the algorithms and operations described herein. In some example embodiments, the processor is a processor of a specific device configured for employing example embodiments of the present invention by further configuration of the processor via executed instructions for performing the algorithms, methods, and operations described herein.

The memory device 320 may be one or more computer-readable storage media that may include volatile and/or non-volatile memory. In some example embodiments, the memory device includes Random Access Memory (RAM) including dynamic and/or static RAM, on-chip or off-chip cache memory, and/or the like. Further, the memory device may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. The memory device may include a cache area for temporary storage of data. In this regard, at least a portion or the entire memory device may be included within the processor 310.

Further, the memory device 320 may be configured to store information, data, applications, computer-readable program code instructions, and/or the like for enabling the processor 310 and the example apparatus 300 to carry out various functions in accordance with an example embodiment of the present invention described herein. For example, the memory device may be configured to buffer input data for processing by the processor. Additionally, or alternatively, the memory device may be configured to store instructions for execution by the processor. The memory may be securely protected, with the integrity of the data stored therein being ensured. In this regard, data access may be checked with authentication and authorized based on access control policies.

The I/O interface 330 may be any device, circuitry, or means embodied in hardware, software or a combination of hardware and software that is configured to interface the processor 310 with other circuitry or devices, such as the communications interface 340. In some example embodiments, the processor may interface with the memory device via the I/O interface. The I/O interface may be configured to convert signals and data into a form that may be interpreted by the processor. The I/O interface may also perform buffering of inputs and outputs to support the operation of the processor. According to some example embodiments, the processor and the I/O interface may be combined onto a single chip or integrated circuit configured to perform, or cause the apparatus 300 to perform, various functionalities of the present invention.

The communication interface 340 may be any device or means embodied in hardware, software or a combination of hardware and software that is configured to receive and/or transmit data from/to one or more networks 360 (e.g., radio access networks 110, core networks 120, 220, etc.) and/or any other device or module (e.g., other similar apparatuses) in communication with the example apparatus 300. The processor 310 may also be configured to facilitate communications via the communications interface by, for example, controlling hardware included within the communications interface. In this regard, the communication interface may include, for example, one or more antennas, a transmitter, a receiver, a transceiver and/or supporting hardware, including, for example, a processor for enabling communications. Via the communication interface, the example apparatus may communicate with various other network elements in a device-to-device fashion and/or via indirect communications.

The communications interface 340 may be configured to provide for communications in accordance with any of a number of wired or wireless communication standards. The communications interface may be configured to support communications in multiple antenna environments, such as multiple input multiple output (MIMO) environments. Further, the communications interface may be configured to support orthogonal frequency division multiplexed (OFDM) signaling. In some example embodiments, the communications interface may be configured to communicate in accordance with various techniques including, as explained above, any of a number of 2G, 3G, 4G or higher generation mobile communication technologies, radio frequency (RF), infrared data association (IrDA) or any of a number of different wireless networking techniques. The communications interface may also be configured to support communications at the network layer, possibly via Internet Protocol (IP).

Figure 4:
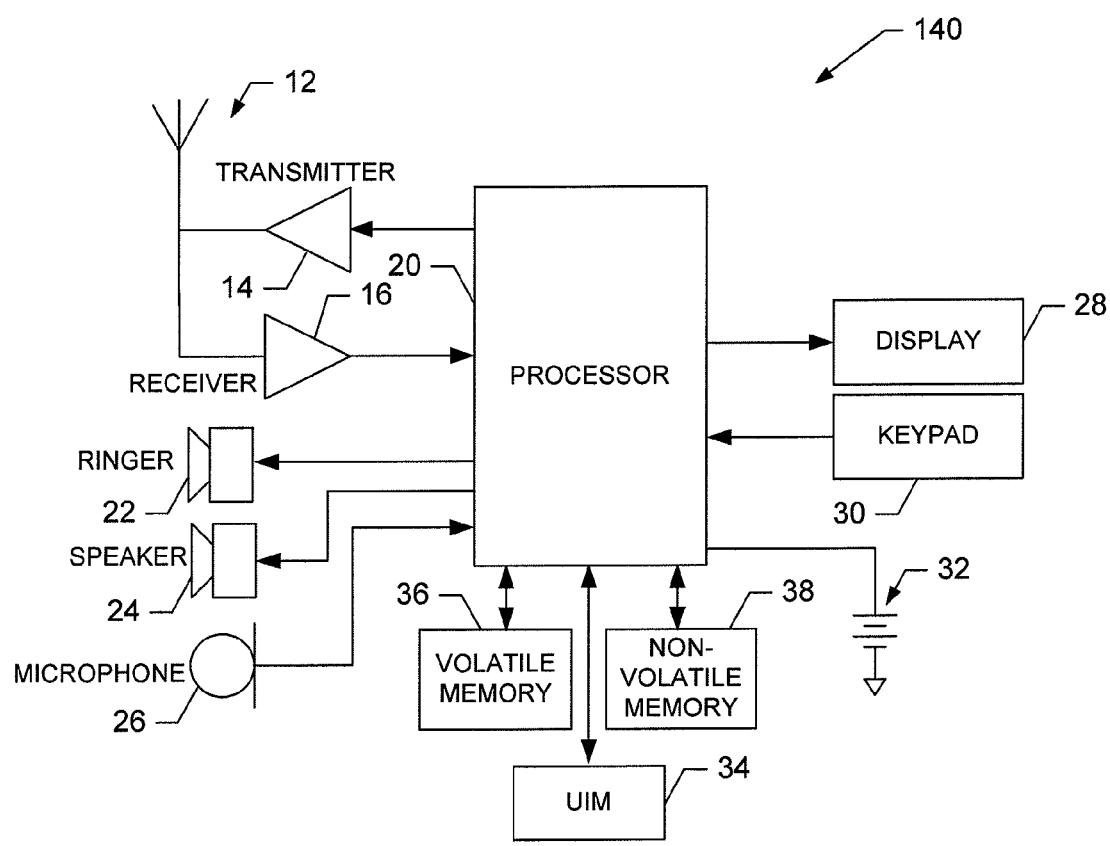
FIG. 4 is a block diagram of an apparatus that may be configured to operate as or in conjunction with a user equipment according to one example embodiment of the present invention.

As shown in FIGS. 1 and 2, in addition to an apparatus 300 such as shown in FIG. 3 that is embodied by or otherwise associated with a network entity, such as a base station 120. 230, the system of one example embodiment also includes a user equipment (UE) 140, 210, as shown in FIG. 4. It should be understood, however, that the UE 140, 210 as illustrated and hereinafter described is merely illustrative of one type of device that may benefit from various embodiments and, therefore, should not be taken to limit the scope of embodiments. As such, numerous types of UEs, such as portable digital assistants (PDAs), mobile telephones, pagers, mobile televisions, gaming devices, laptop computers, cameras, video recorders, audio/video players, radios, positioning devices (for example, global positioning system (GPS) devices), or any combination of the aforementioned, and other types of voice and text communications systems, may readily employ various embodiments.

The UE 140, 210 may include an antenna 12 (or multiple antennas) in operable communication with a transmitter 14 and a receiver 16. The UE 140, 210 may further include an apparatus, such as a processor 20 or other processing device, which provides signals to and receives signals from the transmitter 14 and receiver 16, respectively. The signals include signaling information in accordance with the air interface standard of the applicable cellular system, and also user speech, received data and/or user generated data. In this regard, the UE 140, 210 is capable of operating with one or more air interface standards, communication protocols, modulation types, and access types. By way of illustration, the UE 140, 210 is capable of operating in accordance with any of a number of first, second, third and/or fourth-generation communication protocols or the like. For example, the UE 140, 210 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as E-UTRAN, with fourth-generation (4G) wireless communication protocols or the like. As an alternative (or additionally), the UE 140, 210 may be capable of operating in accordance with non-cellular communication mechanisms. For example, the UE 140, 210 may be capable of communication in a wireless local area network (WLAN) or other communication networks described below in connection with FIG. 2.

In some embodiments, the processor 20 may include circuitry desirable for implementing audio and logic functions of the UE 140, 210. For example, the processor 20 may be comprised of a digital signal processor device, a microprocessor device, and various analog to digital converters, digital to analog converters, and other support circuits. Control and signal processing functions of the UE 140, 210 are allocated between these devices according to their respective capabilities. The processor 20 thus may also include the functionality to convolutionally encode and interleave message and data prior to modulation and transmission. The processor 20 may additionally include an internal voice coder, and may include an internal data modem. Further, the processor 20 may include functionality to operate one or more software programs, which may be stored in memory. For example, the processor 20 may be capable of operating a connectivity program, such as a conventional Web browser. The connectivity program may then allow the UE 140, 210 to transmit and receive Web content, such as location-based content and/ or other web page content, according to a Wireless Application Protocol (WAP), Hypertext Transfer Protocol (HTTP) and/or the like, for example.

The UE 140, 210 may also comprise a user interface including an output device such as a conventional earphone or speaker 24, a ringer 22, a microphone 26, a display 28, and a user input interface, all of which are coupled to the processor 20. The user input interface, which allows the UE 140, 210 to receive data, may include any of a number of devices allowing the UE 140, 210 to receive data, such as a keypad 30, a touch display (not shown) or other input device. In embodiments including the keypad 30, the keypad may include the conventional numeric (0-9) and related keys (#, *), and other hard and soft keys used for operating the UE 140, 210. Alternatively, the keypad 30 may include a conventional QWERTY keypad arrangement. The keypad 30 may also include various soft keys with associated functions. In addition, or alternatively, the UE 140, 210 may include an interface device such as a joystick or other user input interface. The UE 140, 210 further includes a battery 34, such as a vibrating battery pack, for powering various circuits that are required to operate the UE 140, 210, as well as optionally providing mechanical vibration as a detectable output.

The UE 140, 210 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), and the like. The UIM 38 typically stores information elements related to a mobile subscriber. In addition to the UIM 38, the UE 140, 210 may be equipped with memory. For example, the UE 140, 210 may include volatile memory 40, such as volatile Random Access Memory (RAM) including a cache area for the temporary storage of data. The UE 140, 210 may also include other non-volatile memory 42, which may be embedded and/or may be removable. The memories may store any of a number of pieces of information, and data, used by the UE 140, 210 to implement the functions of the UE 140, 210. For example, the memories may include an identifier, such as an international mobile equipment identification (IMEI) code, capable of uniquely identifying the UE 140, 210.

Referring again to FIG. 2, a UE 210 may receive simultaneously communication service from a number of BSs 230 on a used frequency, with each BS assigning the UE one or more downlink dedicated physical channels (DPCH) in a respective one or more cells 240. These cell(s) to which the UE may be simultaneously connected may be defined as an active set. In the system, the UE may be handed over between cells according to a process controlled by a list of available cells, referred to as a neighbor cell list and, according to UTRAN, more particularly stored in a CELL_INFO_LIST.

The neighbor cell list may include the active set and may also include a set of cells, referred to as a monitored set, which the UTRAN 200 may direct the UE 210 to monitor or otherwise measure (the monitored set including cells in the neighbor cell list not in the active set). The monitored set may include a subset of cells operating at the used frequency of the active set (intra-frequency), and one or more subsets of cells operating at one or more frequencies other than the used frequency (inter-frequency). In a manner similar to that by which the UTRAN maintains the active set, the UE may autonomously maintain a virtual active set for each of the other frequencies, where each virtual active set includes one or more of the monitored set cells operating at the respective frequency. A virtual active set may be treated as an active set for a respective non-used frequency.

In addition to the foregoing cells of the neighbor cell list, the UE 210 may be configured to detect and measure a number of cells that are in neither the active set nor the monitored set. This set of cells may be referred to as a detected set.

In the system, a UE 210 may be handed over between cells using the same frequency (intra-frequency handover), or between cells using different frequencies (inter-frequency handover). The UTRAN 200 may direct a UE 210 to perform intra-frequency measurements of cells of the neighbor cell list (active set, monitored set) and detected set. These intra-frequency measurements may be reported to the UTRAN to permit evaluation of the quality of the respective cells and, if appropriate, trigger an intra-frequency handover event. Similarly, the UTRAN may direct the UE to perform inter-frequency measurements of the cells of the virtual active set(s) and the monitored set cells at each frequency. These inter-frequency measurements may be reported to the UTRAN to permit evaluation of the quality of the respective frequencies and, if appropriate, trigger an inter-frequency handover event.

As currently defined by 3GPP, a UE 210 may take or otherwise perform inter-frequency measurements of virtual active cells and monitored set cells to permit evaluation of non-used frequencies and maintain the virtual active set. The cells of these sets are included in the neighbor cell list; and as the UTRAN 200 adds or removes cells from the neighbor cell list, the UTRAN may add or remove cells from affecting the inter-frequency measurements. This may permit the network to account for scenarios such as country border areas—whereby the network operator may not want cells from another network to affect the evaluation of whether to perform an inter-frequency handover (event trigger evaluation). As the detected set cells are not included in the neighbor cell list, however, the UTRAN may not have the same level of control over those cells that may affect inter-frequency measurements. Thus, as currently defined by 3GPP, the detected set cells are not included in inter-frequency measurements.

If detected set cells were simply allowed to affect inter-frequency measurements (and hence the virtual active set and event trigger evaluation), the operator/network may not have sufficient control over which cells are allowed to affect the measurements; and in some cases, a UE 210 may trigger a measurement report to the UTRAN 200 that unnecessarily increases signaling load to the network and may result in a failed handover. It may also prevent the UE from triggering an event (e.g., reporting event) for a frequency based on a valid neighbor cell, if the event was previously triggered by a non-valid cell. Furthermore, it may be risky and complicated to modify legacy handling of the virtual active set, which may introduce unforeseen problems to the field.

As explained below, an example embodiment of the present invention therefore provides cell-based inter-frequency measurement events whereby a UE 210 may be triggered to report measurements of one or more detected set cells to the network. The network may then control the addition or deletion of one or more detected set cells to the neighbor cell list based on the reported detected set cells, and thereby control the cells available for inclusion in the virtual active set. That is, the network may evaluate the reported detected set cells to determine whether to update the neighbor cell list to include one or more of the respective detected set cells. Any update to the neighbor cell list may be reported to the UE. The UE may then perform inter-frequency measurements of monitored set cells of the neighbor cell list including the respective detected set cells to permit evaluation of non-used frequencies and maintain the virtual active set for each non-used frequency.

Figure 5:
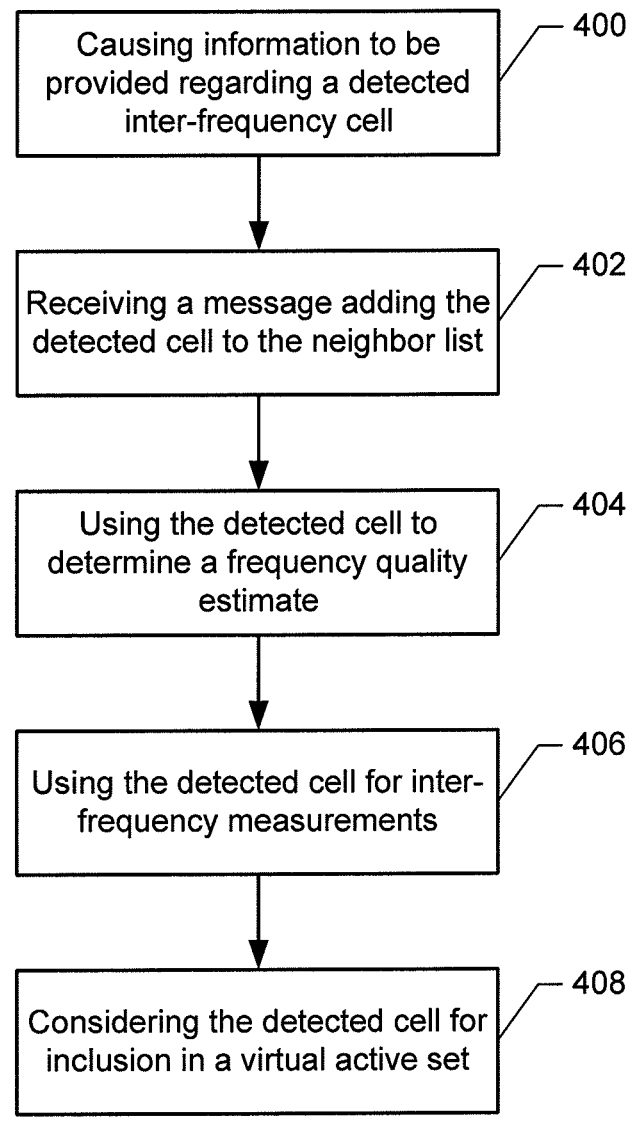
FIG. 5 is a flow chart illustrating operations performed in accordance with one embodiment of the present invention.

As shown in operation 400 of FIG. 5, an apparatus may cause information to be provided to the network, such as a base station 120, 230, regarding a detected inter-frequency cell, that is, a detected set cell having a non-used frequency. In this regard, the apparatus may, in some embodiments, be a UE 140, 210. As such, the apparatus may include means, such as the processor 20, the transmitter 14, the antenna 12 or the like for causing information regarding a detected inter-frequency cell to be provided to the network. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The network, such as a base station 120, 230, may be advised of one or more detected set cell(s) by the UE 140, 210 in various manners. For example, the network may be advised of the detected set cell(s) in an instance in which the detected set cell(s) meet a predefined criteria, in conjunction with a report for another event or in a periodically issued report. In regards to an example embodiment shown in FIG. 6 in which the network, such as a base station 120, 230, is advised of the detected set cell(s) in an instance in which the detected set cell(s) meet a predefined criteria, an inter-frequency measurement event may be defined at the UE 140, 210, such as in response to a measurement control message from the network (NW) to the UE. The inter-frequency measurement event may cause a report to be triggered from the UE 140, 210 to the network in an instance in which the measurement(s) associated with a detected set cell is determined by the UE, such as by the processor 20, to satisfy a predefined criteria, e.g., an event trigger condition. While various predefined criteria may be established to trigger the reporting of the inter-frequency measurement event, one example criteria is the detection by the UE 140, 210, such as by the processor 20, of a detected cell entering the reporting range, such as by having a signal strength or signal to noise ratio greater than a predefined threshold. Another example criteria may be the detection by the UE 140, 210, such as by the processor 20, of a detected cell having better signal strength, a better signal to noise ratio or otherwise performing better than a cell in the monitored set of cells or, alternatively, in the virtual active set for the respective frequency. Further details regarding the use of an inter-frequency measurement event to cause a measurement report to be triggered from the UE 140, 210 to the network are provided by U.S. Provisional Patent Application No. 61/374,016, entitled Cell-Based Inter-Frequency Measurement Events for Detected or Monitored Set Cells, filed on Aug. 16, 2010, the contents of which are incorporated herein in their entirety.

In regards to an example embodiment in which the network, such as a base station 120, 230 is advised of the detected set cell(s) in conjunction with the report of another event, the UE 140, 210, such as by the processor 20, may be configured to provide measurement reports of various events, such as various inter-frequency events triggered by cells already on the neighbor list that meet predefined criteria.

Figure 7:
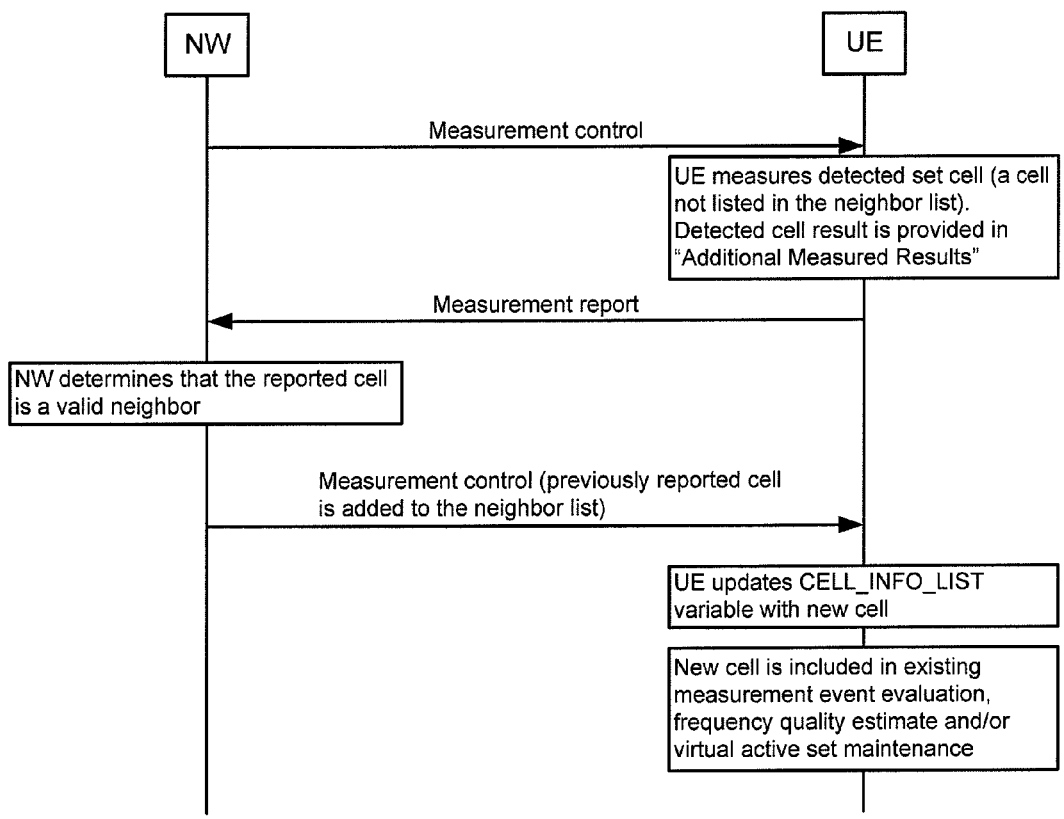

Along with the report of the various events, the UE 140, 210, such as by the processor 20, of one embodiment may be configured to supplement the report with information relating to one or more detected set cell(s), as shown in FIG. 7. For example, the UE 140, 210, such as by the processor 20, may be configured to provide a measurement report relating to one or more detected set cell(s) as Additional Measured Results along with the report of the event that triggered the report. The information, such as the measurement report, relating to one or more detected set cell(s) may provide information regarding one or more detected set cell(s) that satisfy predefined criteria, such as by having a signal strength or signal to noise ratio greater than a predefined threshold or greater than a cell in either the detected set cells or the virtual active set for the respective frequency.

While the reliance upon reports that are generated in response to another event to provide the information associated with one or more detected set cells offers an advantage in that no additional report need be made and no new event triggers need be defined, there may be some delay between the detection by the UE 140, 210 of a detected cell entering the reporting range and the actual provision of the information regarding the detected cell to the network. While this embodiment may be useful in a number of different scenarios, the reporting methodology of this example embodiment may be useful in regards to an uncoordinated closed subscriber group (CSG). In this regard, in 3GPP, a UE currently only considers a single CSG cell at a time for inter-frequency measurements. If soft handover support for uncoordinated femtocells is introduced, however, the network may rely upon reports generated in response to another event to receive information regarding the CSG-based interfrequency report in order to allow the CSG cell to be added to the neighbor list as described below so as to permit the CSG cell to be considered for subsequent soft handovers.

Figure 8:
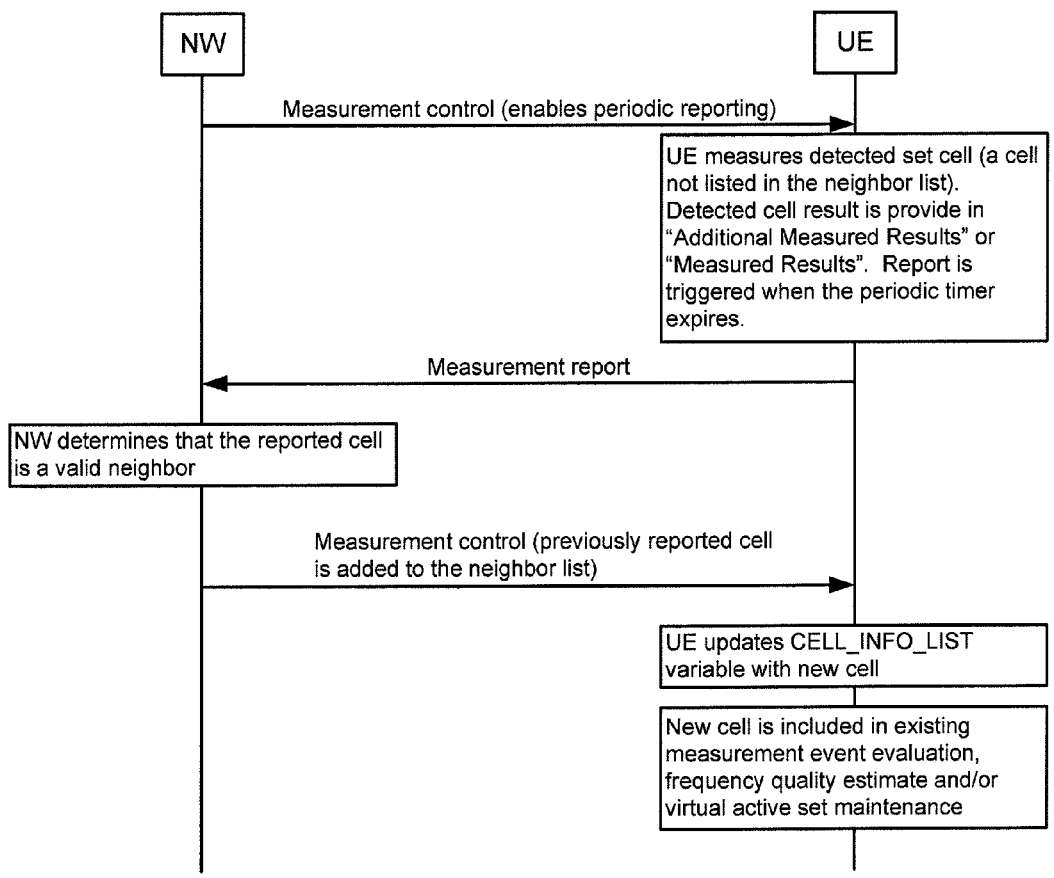

In regards to an embodiment in which the network is periodically advised of information regarding the detected set cell(s), the UE 140, 210, such as the processor 20, may be configured to periodically provide the network, such as the base station 120, 230 with information regarding detected set cell(s), such as information regarding one or more detected set cell(s) that satisfy predefined criteria, such as by having a signal strength or signal to noise ratio greater than a predefined threshold or greater than a cell in either the detected set cells or the virtual active set for the respective frequency. As shown in FIG. 8, for example, the information regarding the detected set cell(s) may be provided as Additional Measurement Results or Measured Results. While the reliance upon periodic reports offers an advantage in that no additional report need be made and no new event triggers need be defined, there may be some delay between the detection by the UE 140, 210 of a detected cell entering the reporting range and the actual provision of the information regarding the detected cell to the network.

As described above, the network may receive information regarding a detected set cell(s) in various manners. Regardless of the manner in which the network receives the information regarding the detected set cell(s), the network, such as the base station 120, 230, of one example embodiment may be configured to determine whether the detected set cell(s) for which information was received is a valid, or known, neighbor cell. In this regard, the network may maintain a listing, such as an extended neighbor cell list, that identifies a number of cells other than those on the neighbor list, such as based upon network planning information or other manual configuration, that may be utilized by the network. If the detected set cell(s) are included in the listing, e.g., the extended neighbor list, the network may consider the detected set cell(s) to be valid or known. Alternatively, if the detected set cell(s) are not included in the extended neighbor list, such as in an instance in which the detected set cell(s) are cells of a different network operator and/or are located in a different country, the network will not consider the detected set cell(s) to be valid or known and will not further consider the detected set cell(s) for inclusion in the neighbor list.

If the network, such as the base station 120, 230, determines the detected set cell(s) to be valid or known, the network, such as the base station 120, 230, may be configured to add the detected set cell(s) to the neighbor list for the UE 140, 210. The network, such as the base station 120, 230, may either automatically add the detected set cell(s) to the neighbor list in an instance in which the detected set cell(s) are determined to be valid or known, or the network may also require the detected set cell(s) that are determined to be valid or known to satisfy one or more other requirements prior to adding the detected set cell(s) to the neighbor list. For example, the network, such as the base station 120, 230, may require the detected set cell(s) to satisfy a predefined criteria, such as by having a signal strength or a signal to noise ratio greater than a predefined threshold, or to have better performance, such as in terms of signal strength or signal to noise ratio, than one or more other cells that were previously included in the neighbor list.

In an instance in which the network determines that the detected set cell(s) are to be added to neighbor list, the network, such as the base station 120, 230, may determine if the neighbor list is full, such as by including a listing of 32 cells in one embodiment. If the neighbor list is not full, the network, such as the base station 120, 230, may be configured to simply add the detected set cell(s) to the neighbor list. Alternatively, if the neighbor list is full, the network, such as the base station 120, 230, may determine which cell currently on the neighbor list is to be removed from the neighbor list to allow the listing of the detected set cell. The network may be configured to determine the cell to be removed from the neighbor list in various manners. For example, the network, such as the base station 120, 230, may remove a cell currently on the neighbor list that was not included in the prior report from the UE 140, 210, assuming that the prior report from the UE also included a report of cells in the virtual active set and the monitored set cells. Or, the network, such as the base station 120, 230, may be configured to remove a cell currently on the neighbor list if the cell is determined to have left the reporting range. Still further, the network, such as the base station 120, 230, may be configured to remove the cell currently on the neighbor list that has the poorest performance, such as the lowest signal strength or lowest signal to noise ratio, assuming that the detected set cell to be added to the list has a greater performance, such as in terms of signal strength or signal to noise ratio.

Once the network has added the detected set cell(s) to the neighbor list, such as the CELL_INFO_LIST, the network, such as the base station 120, 230, may be configured to signal the updated neighbor list, including the former detected set cell(s), to the UE 140, 210. See FIGS. 6-8. Correspondingly, the apparatus embodied by or otherwise associated with the UE 140, 210 may include means, such as the processor 20, the receiver 16, the antenna 12 or the like, for receiving a message from the network adding the detected set cell to the neighbor list, as shown in operation 402 of FIG. 5, and for updating the neighbor list, such as the CELL_INFO_LIST, with the detected set cell. See FIGS. 6-8. By its inclusion in the neighbor list, the former detected set cell may be utilized by the UE to determine the frequency quality estimates and/or to evaluate the existing inter-frequency measurements. See operations 404 and 406 of FIG. 5. Additionally, the former detected set cell that is now included in the neighbor list may be considered by the UE for inclusion in the virtual active set for the respective frequency and may be used for existing inter-frequency event handling. See operation 408. Accordingly, the apparatus embodied or otherwise associated with the UE 140, 210 may include means, such as the processor 20 or the like, for using the former detected cell to determine a frequency quality estimate, for using the former detected cell for inter-frequency measurements and/or for considering the former detected cell for inclusion in a virtual active set. See also FIGS. 6-8.

An apparatus may also be provided for performing the various operations of a network entity, such as a base station 120, 230, described above and shown in FIG. 9 in accordance with one embodiment of the present invention. The apparatus may, in some embodiments, be a base station 120, 230 configured to employ an example embodiment of the present invention. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

Figure 6:
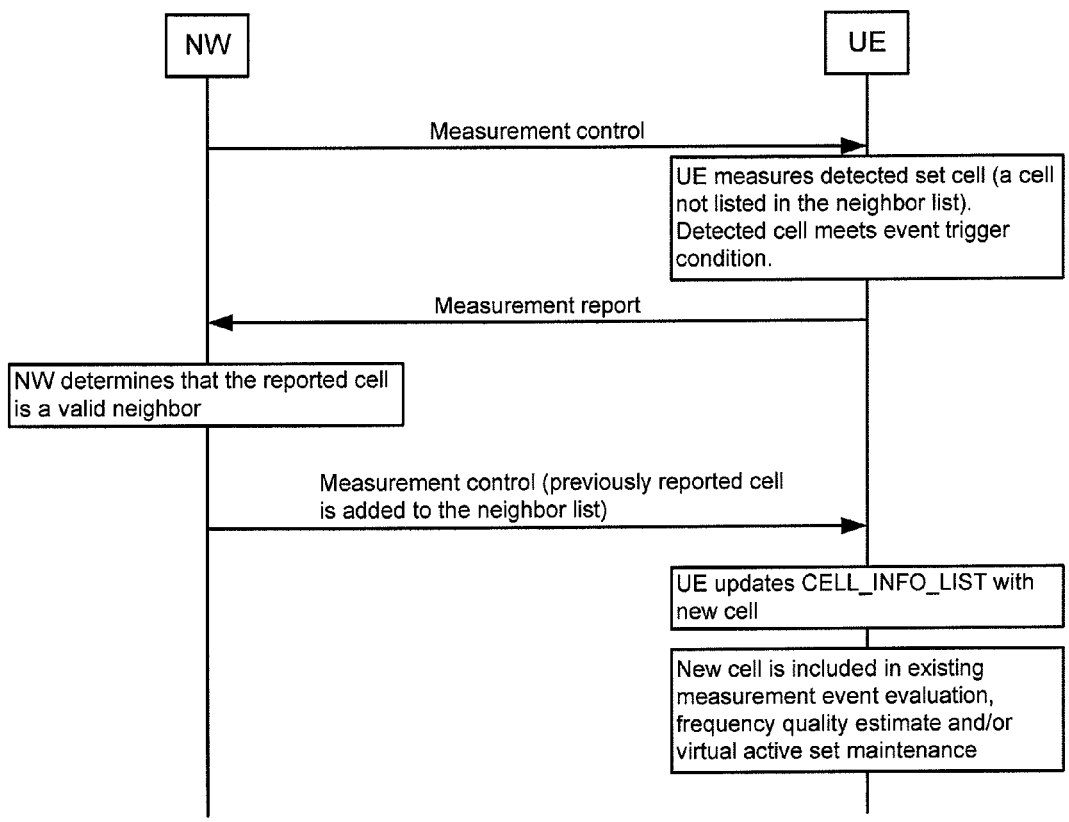
FIGS. 6-8 are signal flow diagrams in accordance with example embodiments of the present invention.
Figure 9:
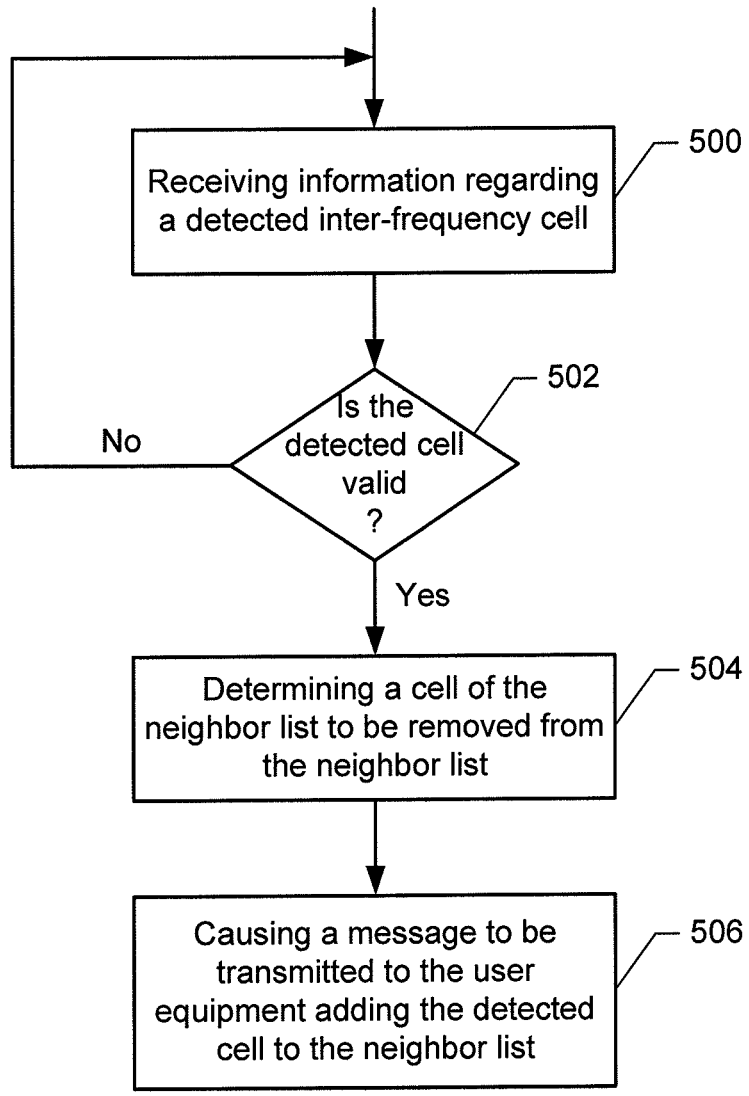
FIG. 9 is a flow chart illustrating operations performed in accordance with one embodiment of the present invention.

As shown in operation 500 of FIG. 9, the apparatus may include means, such as the processor 310, I/O interface 330, communication interface 340 or the like, for receiving information from a UE 140, 210 regarding a detected set cell, such as via a measurement report. As described above, the apparatus may also include means, such as the processor 310 or the like, for determining if the detected set cell is valid, such as by determining if the detected set cell is included within a listing of cells, such as an extended neighbor cell list. See operation 502 of FIG. 9. If the detected set cell is determined not to be valid, the apparatus may ignore the notification of the detected set cell from the UE 140, 210 and may await notification of another detected set cell or may otherwise await the next measurement report from the UE. If, however, the detected set cell is determined to be valid, the apparatus may include means, such as the processor 310, for determining if a cell is to or needs to be removed from the neighbor list and, if so, determining the cell to be removed from the neighbor list. See operation 504. The apparatus of this example embodiment may also include means, such as the processor 310, the I/O interface 330, the communications interface 340 and the like, for causing a message, such as a measurement control message as shown in FIGS. 6-8, to be transmitted to the UE 140, 210 adding the detected set cell to the neighbor list. In this regard, an updated neighbor list may be provided to the UE 140, 210 or information may be provided to the UE advising the UE of the changes to the prior neighbor list, that is, the addition of the former detected set cell and the deletion of another cell. Thereafter, the former neighbor cell may be utilized in conjunction with frequency quality estimates and/or inter-frequency measurements and may be considered for inclusion in the virtual active set for the respective non-used frequency, as described above.

As described above, FIGS. 5 and 9 are flowcharts of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above in regard to FIG. 5 may be stored by a memory device 40, 42 of the UE 140, 210 and executed by a processor 20 of the UE. Correspondingly, the computer program instructions which embody the procedures described above in regard to FIG. 9 may be stored by a memory device 40, 42 of a network entity, such as a base station 120, 230 and executed by a processor 310 of the network entity. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a non-transitory computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

In one embodiment, a method is provided that comprises receiving information regarding a detected cell that is not on a neighbor list for a user equipment (UE) and that has a different frequency than the frequency currently in use by the UE and causing a message to be transmitted to the UE adding the detected cell to the neighbor list.

The method of one example embodiment also comprises determining whether the detected cell is valid. In this example embodiment, causing the message to be transmitted to the UE adding the detected cell to the neighbor list comprises causing the message to be transmitted to the UE adding the detected cell to the neighbor list only in an instance in which the detected cell is determined to be valid. The method of one example embodiment may also comprise determining a cell of the neighbor list to be removed from the neighbor list prior to causing the message to be transmitted to the UE adding the detected cell to the neighbor list In one embodiment, an apparatus is provided which includes at least one processor and at least one memory storing computer program code. The at least one memory and the stored computer program code are configured, with the at least one processor, to cause the apparatus to at least receive information regarding a detected cell that is not on a neighbor list for a user equipment (UE) and that has a different frequency than the frequency currently in use by the UE and cause a message to be transmitted to the UE adding the detected cell to the neighbor list.

The at least one memory and the stored computer program code may also be configured, with the at least one processor, to cause the apparatus to determine whether the detected cell is valid. In this example embodiment, the at least one memory and the stored computer program code may also be configured, with the at least one processor, to cause the message to be transmitted to the UE adding the detected cell to the neighbor list by causing the message to be transmitted to the UE adding the detected cell to the neighbor list only in an instance in which the detected cell is determined to be valid. The at least one memory and the stored computer program code may also be configured, with the at least one processor, to cause the apparatus to determine a cell of the neighbor list to be removed from the neighbor list prior to causing the message to be transmitted to the UE adding the detected cell to the neighbor list In one embodiment, a computer program product is provided that includes at least one computer-readable medium having computer-readable program instructions stored therein. The computer-readable program instructions include program instructions configured to receive information regarding a detected cell that is not on a neighbor list for a user equipment (UE) and that has a different frequency than the frequency currently in use by the UE and to cause a message to be transmitted to the UE adding the detected cell to the neighbor list.

The computer-readable program instructions of one example embodiment also include program instructions configured to determine whether the detected cell is valid. In this example embodiment, the program instructions configured to cause the message to be transmitted to the UE adding the detected cell to the neighbor list include program instructions configured to cause the message to be transmitted to the UE adding the detected cell to the neighbor list only in an instance in which the detected cell is determined to be valid. The computer-readable program instructions of one example embodiment may also include program instructions configured to determine a cell of the neighbor list to be removed from the neighbor list prior to causing the message to be transmitted to the UE adding the detected cell to the neighbor list In one embodiment, an apparatus is provided that comprises means for receiving information regarding a detected cell that is not on a neighbor list for a user equipment (UE) and that has a different frequency than the frequency currently in use by the UE and means for causing a message to be transmitted to the UE adding the detected cell to the neighbor list.

The apparatus of one example embodiment also comprises means for determining whether the detected cell is valid. In this example embodiment, the means for causing the message to be transmitted to the UE adding the detected cell to the neighbor list comprises means for causing the message to be transmitted to the UE adding the detected cell to the neighbor list only in an instance in which the detected cell is determined to be valid. The apparatus of one example embodiment may also comprise means for determining a cell of the neighbor list to be removed from the neighbor list prior to causing the message to be transmitted to the UE adding the detected cell to the neighbor list In another embodiment, a method is provided that comprises causing information to be provided regarding a detected cell that is not on a neighbor list and that has a different frequency than the frequency currently in use and receiving a message adding the detected cell to the neighbor list. Once the detected cell is added to the neighbor list, the method may comprise at least one of using the detected cell to determine a frequency quality estimate, using the detected cell for inter-frequency measurements or considering the detected cell for inclusion in a virtual active set.

The method of one example embodiment also comprises determining that the detected cell satisfies a predefined criteria prior to causing the information to be provided regarding the detected cell. The method of another example embodiment comprises causing the information to be provided regarding the detected cell in conjunction with a message regarding another event. The method of a further example embodiment comprises causing the information to be provided regarding the detected cell on a periodic basis.

In another embodiment, an apparatus is provided which includes at least one processor and at least one memory storing computer program code. The at least one memory and the stored computer program code are configured, with the at least one processor, to cause the apparatus to at least cause information to be provided regarding a detected cell that is not on a neighbor list and that has a different frequency than the frequency currently in use and receive a message adding the detected cell to the neighbor list. Once the detected cell is added to the neighbor list, the at least one memory and the stored computer program code may also be configured, with the at least one processor, to cause the apparatus to use the detected cell to determine a frequency quality estimate, use the detected cell for inter-frequency measurements or consider the detected cell for inclusion in a virtual active set.

In one embodiment, the at least one memory and the stored computer program code may also be configured, with the at least one processor, to cause the apparatus to determine that the detected cell satisfies a predefined criteria prior to causing the information to be provided regarding the detected cell. In another embodiment, the at least one memory and the stored computer program code may also be configured, with the at least one processor, to cause the apparatus to cause the information to be provided regarding the detected cell in conjunction with a message regarding another event. In a further embodiment, the at least one memory and the stored computer program code may also be configured, with the at least one processor, to cause the apparatus to cause the information to be provided regarding the detected cell on a periodic basis.

In another embodiment, a computer program product is provided that includes at least one computer-readable medium having computer-readable program instructions stored therein. The computer-readable program instructions include program instructions configured to cause information to be provided regarding a detected cell that is not on a neighbor list and that has a different frequency than the frequency currently in use and to receive a message adding the detected cell to the neighbor list. Once the detected cell is added to the neighbor list, the computer-readable program instructions may include program instructions configured to use the detected cell to determine a frequency quality estimate, use the detected cell for inter-frequency measurements or consider the detected cell for inclusion in a virtual active set.

The computer-readable program instructions of one example embodiment also comprises program instructions configured to determine that the detected cell satisfies a predefined criteria prior to causing the information to be provided regarding the detected cell. The computer-readable program instructions of another example embodiment may also include program instructions configured to cause the information to be provided regarding the detected cell in conjunction with a message regarding another event. The computer-readable program instructions of a further example embodiment may include program instructions configured to cause the information to be provided regarding the detected cell on a periodic basis.

In another embodiment, an apparatus is provided that comprises means for causing information to be provided regarding a detected cell that is not on a neighbor list and that has a different frequency than the frequency currently in use and means for receiving a message adding the detected cell to the neighbor list. Once the detected cell is added to the neighbor list, the apparatus may comprise means for using the detected cell to determine a frequency quality estimate, means for using the detected cell for inter-frequency measurements or means for considering the detected cell for inclusion in a virtual active set.

The apparatus of one example embodiment may also comprise means for determining that the detected cell satisfies a predefined criteria prior to causing the information to be provided regarding the detected cell. The apparatus of another example embodiment may also comprise means for causing the information to be provided regarding the detected cell in conjunction with a message regarding another event. The apparatus of a further example embodiment may also comprise means for causing the information to be provided regarding the detected cell on a periodic basis.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe some example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving information with a processor regarding a detected cell that is not on a neighbor list for a user equipment (UE) and that has a different frequency than the frequency currently in use by the UE, wherein receiving information regarding the detected cell comprises receiving information regarding a closed subscriber group (CSG)-based interfrequency report in conjunction with a report generated in response to another event;
   determining whether the detected cell is valid; and
   only in an instance in which the detected cell is determined to be valid, causing a message to be provided to the UE to cause the detected cell to be added to the neighbor list, wherein the detected cell to be added to the neighbor list comprises a CSG cell.

2. A method according to claim 1 further comprising determining a cell of the neighbor list to be removed from the list prior to causing the message to be provided to the UE.

3. A method according to claim 1 wherein determining whether the detected cell is valid comprises determining the detected cell to be valid in an instance in which the detected cell is included in a listing of cells other than the cells on the neighbor list.

4. A method according to claim 3 wherein the listing comprises an extended neighbor cell list.

5. An apparatus comprising at least one processor and at least one memory including computer program code, the at least one memory and the computer program code configured to, with the processor, cause the apparatus to at least:
   receive information regarding a detected cell that is not on a neighbor list for a user equipment (UE) and that has a different frequency than the frequency currently in use by the UE, wherein information received regarding the detected cell comprises information regarding a closed subscriber group (CSG)-based interfrequency report that is received in conjunction with a report generated in response to another event;
   determine whether the detected cell is valid; and
   only in an instance in which the detected cell is determined to be valid, cause a message to be provided to the UE to cause the detected cell to be added to the neighbor list, wherein the detected cell to be added to the neighbor list comprises a CSG cell.

6. An apparatus according to claim 5 wherein the at least one memory and the computer program code are further configured to, with the processor, cause the apparatus to determine a cell of the neighbor list to be removed from the list prior to causing the message to be provided to the UE.

7. An apparatus according to claim 5 wherein the at least one memory and the computer program code are configured to, with the processor, cause the apparatus to determine whether the detected cell is valid by determining the detected cell to be valid in an instance in which the detected cell is included in a listing of cells other than the cells on the neighbor list.

8. An apparatus according to claim 7 wherein the listing comprises an extended neighbor cell list.

9. A method comprising:
   causing information to be provided regarding a detected cell that is not on a neighbor list and that has a different frequency than the frequency currently in use, wherein causing information to be provided regarding the detected cell comprises causing information regarding a closed subscriber group (CSG)-based interfrequency report to be provided in conjunction with a report generated in response to another event; and
   receiving a message regarding addition of the detected cell to the neighbor list; and
   adding, with a processor, the detected cell to the neighbor list, wherein the detected cell added to the neighbor list comprises a CSG cell.

10. A method according to claim 9 further comprising using the detected cell to determine a frequency quality estimate once the detected cell has been added to the neighbor list.

11. A method according to claim 9 further comprising using the detected cell for inter-frequency measurements once the detected cell has been added to the neighbor list.

12. A method according to claim 9 further comprising considering the detected cell for inclusion in a virtual active set once the detected cell has been added to the neighbor list.

13. A method according to claim 9 further comprising determining that the detected cell satisfies a predefined criteria prior to causing information to be provided regarding the detected cell.

14. An apparatus comprising at least one processor and at least one memory including computer program code, the at least one memory and the computer program code configured to, with the processor, cause the apparatus to at least:
   causing information to be provided regarding a detected cell that is not on a neighbor list and that has a different frequency than the frequency currently in use by causing information regarding a closed subscriber group (CSG)- based interfrequency report to be provided in conjunction with a report generated in response to another event; and receiving a message regarding addition of the detected cell to the neighbor list; and adding the detected cell to the neighbor list, wherein the detected cell added to the neighbor list comprises a CSG cell.

15. An apparatus according to claim 14 wherein the at least one memory and the computer program code are further configured to, with the processor, cause the apparatus to use the detected cell to determine a frequency quality estimate once the detected cell has been added to the neighbor list.

16. An apparatus according to claim 14 wherein the at least one memory and the computer program code are further configured to, with the processor, cause the apparatus to use the detected cell for inter-frequency measurements once the detected cell has been added to the neighbor list.

17. An apparatus according to claim 14 wherein the at least one memory and the computer program code are further configured to, with the processor, cause the apparatus to consider the detected cell for inclusion in a virtual active set once the detected cell has been added to the neighbor list.

18. An apparatus according to claim 14 wherein the at least one memory and the computer program code are further configured to, with the processor, cause the apparatus to determine that the detected cell satisfies a predefined criteria prior to causing information to be provided regarding the detected cell.

* * * * *